United States Patent
Mei et al.

(10) Patent No.: US 9,152,709 B2
(45) Date of Patent: Oct. 6, 2015

(54) CROSS-DOMAIN TOPIC SPACE

(71) Applicant: Microsoft Corporation, Redmond, WA (US)

(72) Inventors: Tao Mei, Beijing (CN); Shipeng Li, Palo Alto, CA (US); Suman Deb Roy, Columbia, MO (US); Wenjun Zeng, Columbia, MO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 102 days.

(21) Appl. No.: 13/776,138

(22) Filed: Feb. 25, 2013

(65) Prior Publication Data

US 2014/0244614 A1     Aug. 28, 2014

(51) Int. Cl.
*G06F 17/30*     (2006.01)

(52) U.S. Cl.
CPC ........ *G06F 17/3082* (2013.01); *G06F 17/3064* (2013.01); *G06F 17/3097* (2013.01); *G06F 17/30646* (2013.01); *G06F 17/30731* (2013.01)

(58) Field of Classification Search
USPC ................................. 707/708, 728, 731, 771
See application file for complete search history.

(56) References Cited

U.S. PATENT DOCUMENTS

| | | | |
|---|---|---|---|
| 8,015,194 B2 * | 9/2011 | Wolff et al. .................... 707/758 |
| 8,296,253 B2 | 10/2012 | Huberman et al. | |
| 8,311,382 B1 * | 11/2012 | Harwell et al. ................ 386/200 |
| 8,930,239 B2 * | 1/2015 | Ashbaugh .................. 705/14.73 |
| 2009/0037355 A1 | 2/2009 | Brave et al. | |
| 2009/0048904 A1 * | 2/2009 | Newton et al. .................. 705/10 |
| 2009/0150214 A1 * | 6/2009 | Mohan ............................ 705/10 |
| 2010/0023506 A1 * | 1/2010 | Sahni et al. ....................... 707/5 |
| 2010/0205541 A1 * | 8/2010 | Rapaport et al. .............. 715/753 |
| 2010/0269158 A1 * | 10/2010 | Ehler et al. ........................ 726/4 |
| 2011/0179114 A1 * | 7/2011 | Dilip et al. ..................... 709/204 |
| 2012/0005224 A1 | 1/2012 | Ahrens et al. | |
| 2012/0101965 A1 * | 4/2012 | Hennig et al. .................. 706/12 |
| 2012/0191644 A1 * | 7/2012 | Carter et al. .................. 707/608 |
| 2012/0254184 A1 | 10/2012 | Choudhary et al. | |
| 2012/0254917 A1 | 10/2012 | Burkitt et al. | |
| 2012/0271829 A1 | 10/2012 | Jason | |
| 2012/0272160 A1 | 10/2012 | Spivack et al. | |
| 2013/0054558 A1 * | 2/2013 | Raza et al. .................... 707/709 |
| 2013/0080524 A1 * | 3/2013 | Rubinstein et al. ........... 709/204 |
| 2013/0081056 A1 * | 3/2013 | Hu et al. ........................ 719/313 |
| 2013/0103814 A1 * | 4/2013 | Carrasco et al. .............. 709/223 |
| 2013/0232148 A1 * | 9/2013 | MacDonald et al. ......... 707/740 |

OTHER PUBLICATIONS

AlSumait, et al., "On-Line LDA: Adaptive Topic Models for Mining Text Streams with Applications to Topic Detection and Tracking", retrieved on Nov. 19, 2012 at <<http://cs.gmu.edu/~carlotta/publications/AlsumaitL_onlineLDA.pdf>>, IEEE, Proceedings of Conference on Data Mining, Dec. 15, 2008, 10 pages.

(Continued)

*Primary Examiner* — Cam-Linh Nguyen
(74) *Attorney, Agent, or Firm* — Dan Choi; Judy Yee; Micky Minhas

(57) ABSTRACT

Some examples include receiving a microblog entry from a social stream domain. Further, some implementations include determining, based on a topic space associated with the social stream domain and a media domain, a topic that is associated with the microblog entry. Some implementations include determining, based on the topic space, one or more media items that are associated with the topic.

20 Claims, 8 Drawing Sheets

(56) References Cited

OTHER PUBLICATIONS

Blei, et al., "Latent Dirichlet Allocation", retrieved on Nov. 19, 2012 at <<http://www.psychology.adelaide.edu.au/personalpages/staff/simondennis/LexicalSemantics/BleiNgJordan03.pdf>>, Journal of Machine Learning Research, vol. 3, Jan. 3, 2003, pp. 993-1022.

Davidson, et al., "The YouTube Video Recommendation System", retrieved on Nov. 19, 2012 at <<http://stuyresearch.googlecode.com/hg-history/b17661bbfaf905a2078902f1abe6b795d4a29137/blake/resources/p293-davidson.pdf>>, ACM, Proceedings of Conference on Recommender Systems (RecSys), Sep. 26, 2010, pp. 293-296.

Figueiredo, et al., "The Tube over Time: Characterizing Popularity Growth of YouTube Videos", retrieved on Nov. 19, 2012 at <<http://vod.dcc.ufmg.br/traces/youtime/wsdm339d-figueiredo.pdf>>, ACM, Proceedings of Conference on Web Search and Data Mining (WSDM), Feb. 9, 2011, 10 pages.

Hoffman, et al., "Online Learning for Latent Dirichlet Allocation", retrieved on Nov. 19, 2012 at <<http://books.nips.cc/papers/files/nips23/NIPS2010_1291.pdf>>, Proceedings of Conference on Neural Information Processing Systems (NIPS), Dec. 6, 2010, 9 pages.

Hsu, et al., "Knowledge Discovery Over Community-Sharing Media: From Signal to Intelligence", retrieved on Nov. 19, 2012 at <<http://ieeexplore.ieee.org/stamp/stamp.jsp?tp=&arnumber=5202775>>, IEEE, Proceedings of Conference on Multimedia and Expo (ICME), Jun. 28, 2009, pp. 1448-1451.

Jin, et al., "The Wisdom of Social Multimedia: Using Flickr for Prediction and Forecast", retrieved on Nov. 19, 2012 at <<http://www.cs.uiuc.edu/~hanj/pdf/mm10_xjin.pdf>>, ACM, Proceedings of Multimedia Conference (MM), Oct. 25, 2010, 10 pages.

Ma, et al., "Improving recommender systems by incorporating social contextual information", ACM, Transactions on Information Systems, vol. 29, 2011, pp. 1-23.

Mathioudakis, et al., "TwitterMonitor: Trend Detection over the Twitter Stream", retrieved on Nov. 19, 2010 at <<http://queens.db.toronto.edu/~mathiou//TwitterMonitor.pdf>>, ACM, Proceedings of Conference on Management of Data, Jun. 6, 2010, 3 pages.

Naaman, "Social Multimedia: Highlighting Opportunities for Search and Mining of Multimedia Data in Social Media Applications", retrieved on Nov. 19, 2012 at <<http://comminfo.rutgers.edu/~mor/publications/NaamanMTAP10socialMultimedia.pdf>>, Journal of Multimedia Tools and Applications, vol. 49, Apr. 8, 2010, 26 pages.

O'Connor, et al., "TweetMotif: Exploratory Search and Topic Summarization for Twitter", retrieved on Nov. 19, 2012 at <<http://www.aaai.org/ocs/index.php/ICWSM/ICWSM10/paper/viewFile/1540/1907>>, AAAI, Proceedings of Conference on Weblogs and Social Media, May 23, 2010, pp. 384-385.

Ramage, et al., "Characterizing Microblogs with Topic Models", retrieved on Nov. 19, 2012 at <<http://www.aaai.org/ocs/index.php/ICWSM/ICWSM10/paper/download/1528/1846>>, AAAI, Proceedings of Conference on Weblogs and Social Media, May 23, 2010, pp. 130-137.

Sack, et al., "Exploratory Semantic Video Search with yovisto", retrieved on Nov. 19, 2012 at <<http://www.hpi.uni-potsdam.de/fileadmin/hpi/FG_ITS/papers/Web_3.0/2010_Waitelonis_ICSC.pdf>>, IEEE, Proceedings of Conference on Semantic Computing (ICSC), Sep. 22, 2010, pp. 446-447.

Sriram, et al., "Short Text Classification in Twitter to Improve Information Filtering", retrieved on Nov. 19, 2012 at <<http://www.cse.ohio-state.edu/~hakan/publications/TweetClassification.pdf>>, ACM, Proceedings of Conference on Research and Development in Information Retrieval (SIGIR), Jul. 19, 2010, 2 pages.

"Twitter", retrieved on Nov. 21, 2012 at <<http://www.twitter.com>>, 2012, 6 pages.

Wang, et al., "TM-LDA: Efficient Online Modeling of the Latent Topic Transitions in Social Media", retrieved on Nov. 19, 2012 at <<http://mathcs.emory.edu/~benzi/Web_papers/tlda.pdf>>, ACM, Proceedings of Conference on Knowledge Discovery and Data Mining (KDD), Aug. 12, 2012, 9 pages.

Zheng, et al., "Semantic video indexing by fusing explicit and implicit context spaces", ACM Multimedia, 2010.

Zhou, et al., "The Impact of YouTube Recommendation System on Video Views", retrieved on Nov. 19, 2012 at <<http://rio.ecs.umass.edu/mnilpub/papers/IMC10-Zhou.pdf>>, ACM, Proceedings of Conference on Internet Measurement (IMC), Nov. 1, 2010, 7 pages.

* cited by examiner

CROSS-DOMAIN TOPIC SPACE

BACKGROUND

Social media has become a disruptive platform for addressing many multimedia problems that could not be elegantly solved previously. For example, real-time social data may be utilized in semantic video indexing, video (or image) context annotation and visualizing political activity and flu outbreaks, among other examples. Social media streams (e.g., microblogging streams like Twitter®) may be a good indicator of crowd sourcing activity of a social community. The information in social streams is real time. As a result, such information may provide information about real life events quickly. World events such as the Egyptian Revolution, the London riots and the Japan Earthquake have been extensively captured using social streams such as Twitter® and Facebook® updates.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Some implementations provide techniques and arrangements for determining, based on a topic space associated with a social stream domain and a media domain, a topic that is associated with a microblog entry. One or more media items in the media domain that are associated with the topic may be determined based on the topic space. Additionally, some implementations may generate an updated topic space based on a plurality of additional microblog entries that are received via the social stream domain. Based on the updated topic space, at least one different media item (e.g., a "fresh" media item) that is associated with the topic may be determined.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
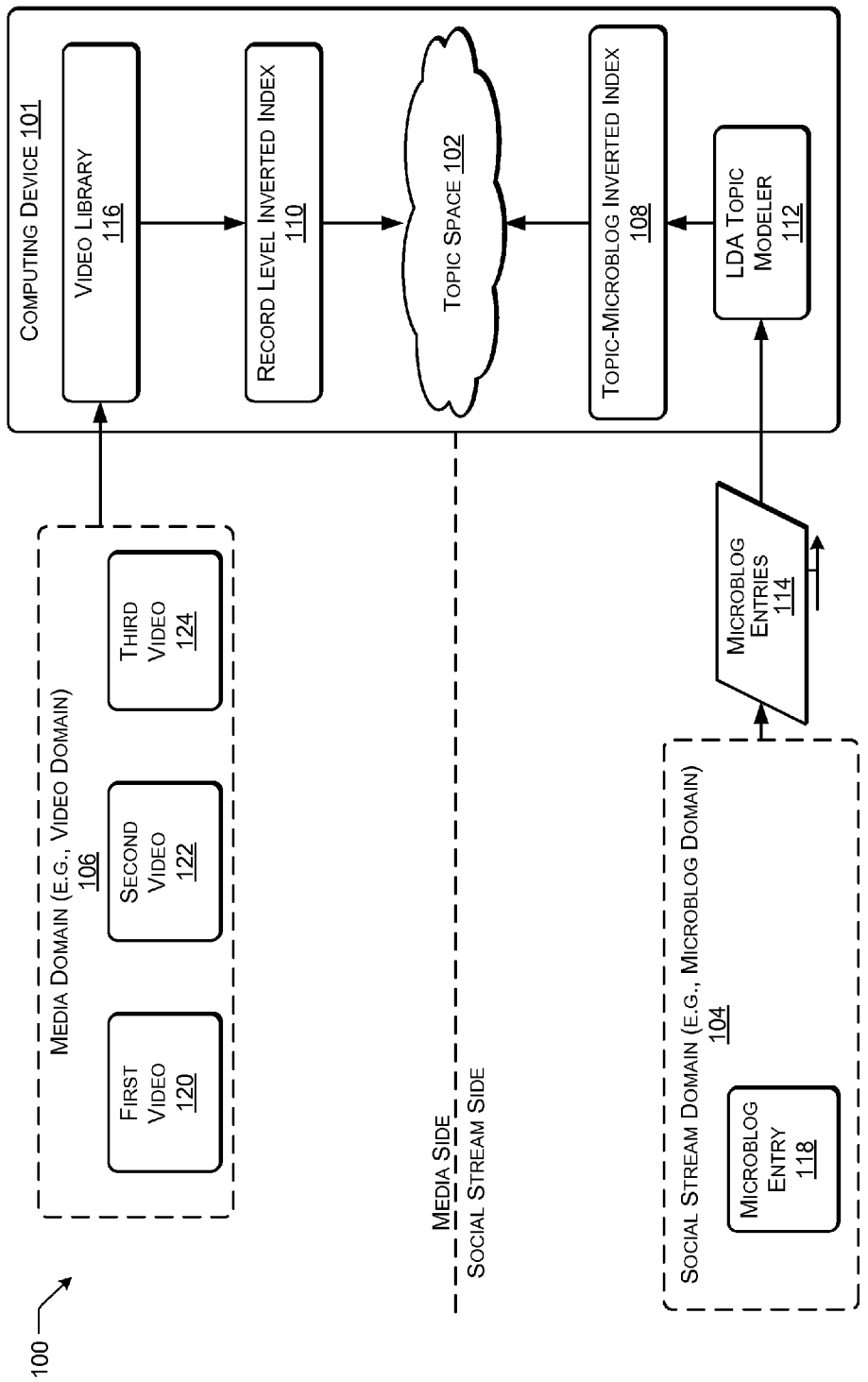
FIG. 1 illustrates an example system including a topic space according to some implementations.

There are various kinds of social media. Some publish valuable information, some share information in real time, and some provide crowd sourcing options. There may be cross-correlations between media data in different domains that may be generated in response to the same events in the physical world. However, social media is distributed disparately, e.g., a social event could be reported via social media (e.g., via Twitter®) and via an online video search engine site (e.g., YouTube®) at the same time. Media on the Internet may be unevenly distributed depending on platforms, popularity and bias, among other factors. As such, the power of a media item may be limited by the domain where the media item originates. For example, video popularity may be judged by view count, but not by how trending the video topic is.

Viral videos, which spread primarily by sharing, do not usually contain any common topics with the trending topics in social media. That is, viral videos do not become suddenly popular because the video topic is popular. Another example is that microblog users may only see related media that is shared via the microblog site, not related media from external sources. As such, a user may perform unguided searches for related media in external resources manually. However, video search engine sites may include a large amount of video or image information that may limit the ability of the user to locate related media that is relevant to the topic.

One aspect of social microblogs like Twitter® is its short text format, which is fast, real-time, and allows events to be instantly reported and distributed online. Consider this in the light of a traditional media application like video recommendation, e.g., a user is watching an old video on "Egypt" (uploaded in 2008) on the eve of the "Egyptian revolutions" (Jan. 29, 2011). Also, consider a journalist who just uploaded a live video of the revolution to a video search engine site. A video recommendation system may not be able to easily relate these two videos. That is, a video recommendation system may not be able to relate the "seed" video that the user is watching and the related newly uploaded "fresh" video, in spite of their topical similarity. Socialized recommendation using social streams has the potential to model factual world events in substantially real time by topic extraction and to subsequently perform tasks such as video associations among the old and "fresh" videos belonging to similar topics. Identifying "fresh" video associations may improve the performance of multimedia applications, such as video recommendation, in terms of topical relevance and popularity.

The present disclosure describes connecting social media from disparate sources on the Internet using a common topic space. The topic space may represent a base context platform upon which multiple media applications can be constructed, representing a bidirectional "bridge" between a social stream domain (e.g., a microblog domain) and a multimedia domain (e.g., a video search engine domain). The topic space may be created based on historical data and updated in substantially real time by extending a Latent Dirichlet Allocation (LDA) model to utilize streaming online data (e.g., microblog entries such as "Tweets®"). The topical model of the present disclosure, referred to herein as an Online Streaming LDA (OSLDA) topic modeler, may extract, learn, populate, and update the topic space in substantially real time, scaling with streaming online data. By utilizing a common topic space that is updated in substantially real time, the present disclosure may allow for media recommendation applications such as microblog enrichment with relevant video recommendations or may allow for query suggestion in response to receiving a microblog entry. Further, the present disclosure describes utilizing social trends as a factor in video popularity, with a popularity ranking on a video publishing site boosted by the magnitude of social trend of the video topics.

Example Implementations

FIG. 1 illustrates an example framework of a system 100 according to some implementations. The system 100 includes at least one computing device 101 that includes one or more processors (not shown) and that stores a topic space 102 between a social stream domain 104 (e.g., a microblog domain) and a media domain 106 (e.g., a video domain). It will be appreciated that the media domain 106 may represent not only a video domain, but also an image domain or an audio domain, among other alternatives. That is, the term "media item" as used herein may refer to video, image, audio, text, or a combination thereof.

The topic space 102 of FIG. 1 represents a common topic space between the social stream domain 104 (social stream side) and the media domain 106 (multimedia side). That is, the topic space 102 may act as a bidirectional bridge between microblog entries and media items, such as videos. The topic space 102 allows social stream data received from the social stream domain 104 (e.g., microblog entries such as "Tweets®") to be connected to topics, and topics to be connected to media items (e.g., videos). As an illustrative example, the topic space 102 may include topics such as "Japan" containing words such as "volcano," "earthquake," etc. In the context of video recommendation, the topic space 102 may allow fresh socially relevant videos (e.g., Japan's Shinmoedake Volcano Eruption in 2012) to be associated with older videos (e.g., Japan Earthquake 2008) to facilitate social trend aware recommendations.

To build the topic space 102, historical data from the social stream domain 104 (e.g., training data that includes a plurality of microblog entries) may be preprocessed, and topics may be extracted to build a topic space from the social stream side. FIG. 1 illustrates the results of this preprocessing as a topic-microblog inverted index 108. On the multimedia side, a set of video Click-Through (CT) data from a commercial video search engine may be used. Video information (e.g., attributes or features such as video tags) may be extracted from the CT data and stored in a library. Based on this information, a record level inverted index 110 may be generated. This index 110 may be further divided by categories for easier indexing.

The following provides an illustrative example of the process of populating from the social stream side. A Latent Dirichlet Allocation (LDA) topic modeler 112 may be used to extract topics ($z \in Z$) from a stream of microblog entries ($d \in D$) (represented in FIG. 1 as microblog entries 114), where Z represents the whole topic space 102 and D represents the entire corpus of microblog entries. The LDA topic modeler 112 generates two distributions: a topical word-topic distribution $P(w|z)$ and a topics-microblog entries distribution $P(z|d)$. The vocabulary consists of words $w \in W$, where W represents the entire vocabulary. Parameters $\alpha$ and $\beta$ are Dirichlet priors to the topic-tweet and the word-topic distributions, respectively. A Tweet® or other microblog entry 114 is a sequence of words, where $w_n$ is the nth word in the sequence.

Consider a k-dimensional Dirichlet random variable $\theta$ that can take values in (k−1) simplex. The LDA topic modeler 112 assumes the following generative process for each tweet d in the corpus D: (i) choose N from a Poisson distribution; (ii) choose $\theta \sim$ Dirichlet($\alpha$); and (iii) for each of the N words $w_n$: (a) Choose a topic $z_n \sim$ Multinomial($\theta$), and (b) Choose a word $w_n$ from $p(w_n|z_n, \beta)$, a multinomial probability conditioned on the topic $z_n$.

The dimensionality k of the Dirichlet distribution is assumed known and fixed. Therefore, the joint distribution of the topic mixture $\theta$, the set of topics N topics Z and N words in the vocabulary W, is given by Equation [1] below:

$$p(\theta, Z, W|\alpha, \beta) = p(\theta|\alpha) \Pi_{n=1}^{N} p(z_n|\theta) p(w_n|z_n, \beta) \quad [1]$$

Thus, the LDA topic modeler 112 may represent each of the microblog entries 114 as a random mixture over latent topics, whereas every topic has a distribution over the words. A topic is comprised of a set of topical words. As an illustrative example, one topic generated by the LDA topic modeler 112 may be: {egypt, mubarak, tahrir, army, revolution, ... }, related to the concept of the Egyptian revolution.

On the video side, a set of videos (V), represented in FIG. 1 as video library 116, have related video identifiers. The membership strength that each video possesses with the set of topics in the topic space 102 may be determined. Note that a video tag may be a video identifier. For the j-th video, the set of tags is represented by $G_j$. As described above, there are a set of topical words that were previously extracted from the microblog entries 114. Let the topical words in the k-th topic be represented by the set $T_k$. Then, treating the set of topics and videos as a bipartite graph, define a link weighting function U, given by Equation [2] below:

$$U_{k,j} = \frac{T_k \cap G_j}{T_k}, \quad 0 \le k < |Z|, \quad 0 \le j < |V| \quad [2]$$

Thus, the more tags that a video has in common with the words of a topic, the higher the weight $U_{k,j}$; and thus the higher the membership of the video towards this topic.

Figure 2:
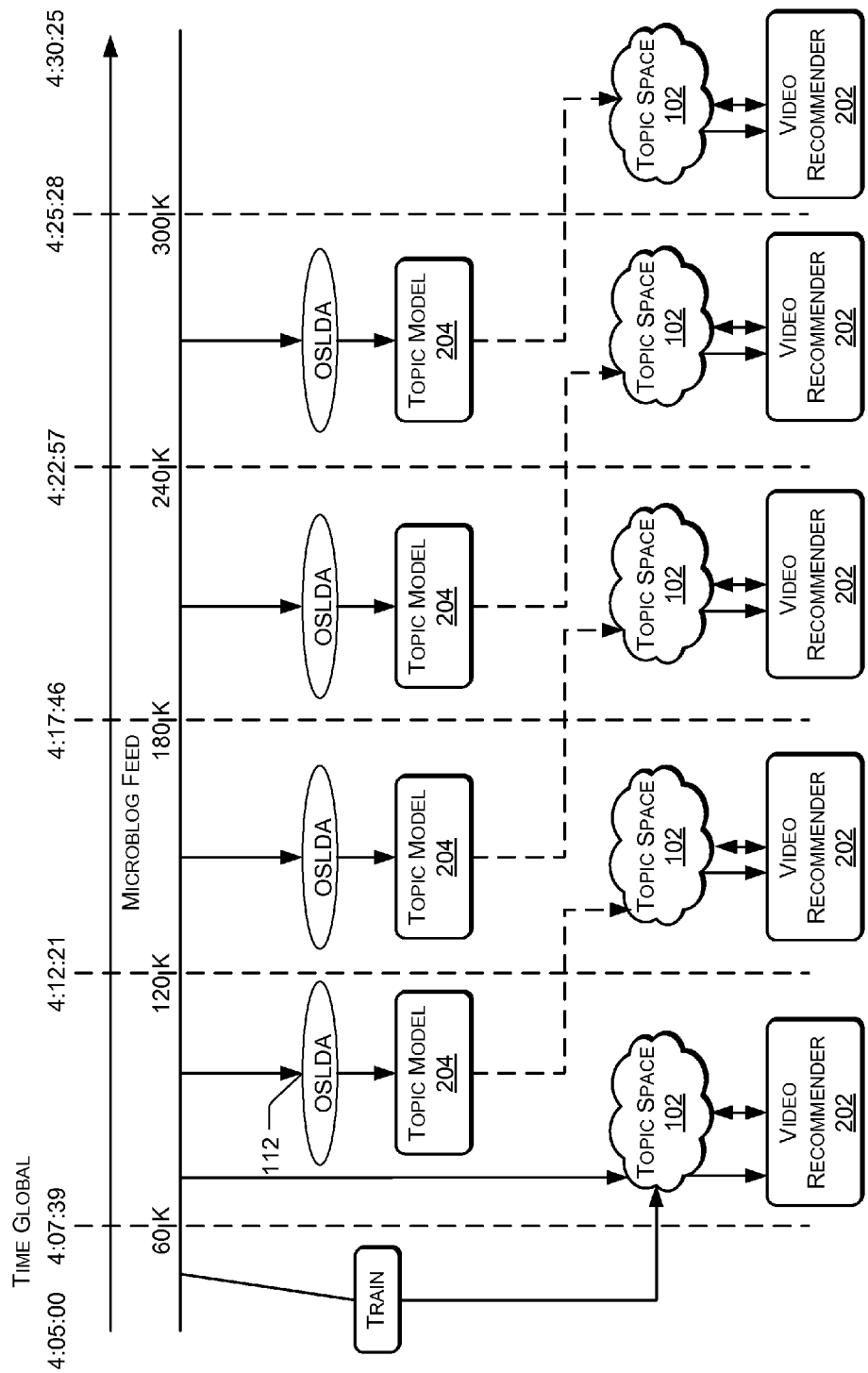
FIG. 2 illustrates an example of a process of updating a topic space for video recommendation according to some implementations.

The system of the present disclosure may learn in substantially real time by updating the topic space 102 with every incoming stream of microblog entries in a time slot (illustrated in FIG. 2). This updating of the topic space 102 in substantially real time is referred to herein as Online Streaming LDA (OSLDA), as the model leverages online LDA and also scales across streams of incoming microblog entries, updating microblog entry-topic and topic-video connections at the same time. Rather than update a word-topic prior distribution $\beta$ with time, OSLDA updates the topic space 102 with time, using an active time decay function. Thus, the OSLDA model may be considered robust in that the model assumes the word-topic distribution can change significantly due to the dynamic nature of microblog entries.

With each time slot, OSLDA models incoming bursts of microblog entries and updates the topic space 102. As an illustrative example, fixing the number of topics to 30 may be enough for 60K microblog entries per time slot (referring to FIG. 2). Processing more microblog entries may take more time, but the number of topics needed to be extracted from a sudden "burst" (e.g., 120K microblog entries) may be less, as such a sudden burst is typically caused by a single event (single topic). As such, the number of topics to be extracted may not double if the microblog burst doubles.

FIG. 2 illustrates an illustrative example of periodically updating the topic space 102. In FIG. 2, the topic space 102 is initially determined based on the training data (e.g., the microblog entries 114 of FIG. 1). A video recommender 202 is also illustrated. OSLDA is used to generate a topic model 204 based on a plurality of incoming microblog entries received over a period of time. Updates to the topic model 204 based on the incoming microblog entries are reflected in an updated topic space 102 that may be utilized by the video recommender 202.

Thus, a bidirectional connection is built between the social stream domain 104 and the multimedia domain 106 using the topic space 102, which may be used to enrich microblog entries with video recommendations and to enrich videos with social popularity ranking.

Microblog entries may be "noisy" and difficult for users to understand. The user experience may be improved by recommending related and relevant media. From the user perspective, this may enrich the information surrounding the microblog entry (in terms of the topic of the entry), as media (e.g., image/video) may be easier for the user to comprehend. Once the LDA topic modeler 112 has been trained on a stream of microblog entries (e.g., the microblog entries 114), the LDA topic modeler 112 may be used to connect a microblog entry (illustrated in FIG. 1 as microblog entry 118) to a topic and to connect the topic to a set of videos (illustrated in FIG. 1 as a first video 120, a second video 122, and a third video 124).

Figure 3:
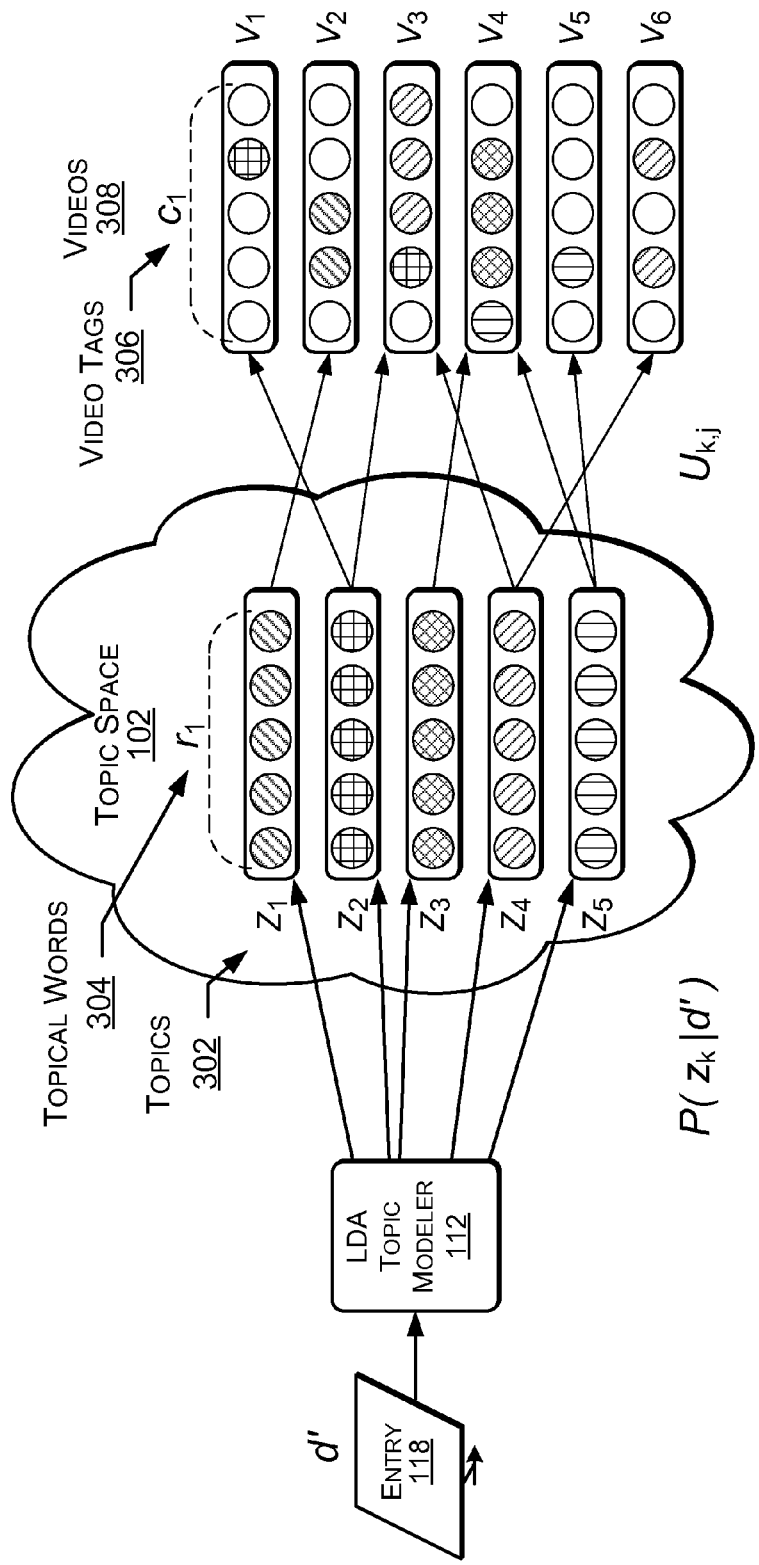
FIG. 3 illustrates an example of a process of recommending videos based on a topic space according to some implementations.

FIG. 3 provides an illustrative example of recommending videos from a single microblog entry. Given a microblog entry d' (e.g., the microblog entry 118 of FIG. 1), the LDA topic modeler 112 may be used to determine the probability distribution of topics 302 (represented as $z_k$ in FIG. 3) for that microblog entry. In the example of FIG. 3, k is 5, with the five different topics represented as $z_1$, $z_2$, $z_3$, $z_4$, and $z_5$. A set of topical words 304 (represented as $r_1$ in FIG. 3 for exemplary topic $z_1$) is associated with each of the topics 302, with each of the topical words 304 represented as circles in FIG. 3. Similarly, a set of video tags 306 (represented as $c_1$ in FIG. 3 for exemplary video $v_1$) is associated with each of the videos 308 (with six videos represented in the example of FIG. 3) in the video library 116. Subsequently, videos to be recommended are selected based on the optimization, represented by Equation [3] below:

$$v^* = \arg\max_{0 \leq j < |V|} \Sigma_{0 \leq k < |Z|} P(z_k|d') \cdot U_{k,j} \qquad [3]$$

In Equation [3], $P(z_k|d')$ signifies the microblog entry-topic link weight, while $U_{k,j}$ represents the topic-video link weight. Thus, the microblog entry 118 connects to those videos for which it has the strongest links through the topic space 102. Thus, the present disclosure may empower microblog entries with related videos from another domain (e.g., the multimedia domain 106).

Further, microblog social trends are also a distribution over topics in the topic space 102. Such trends are a measure of real-time social popularity. By leveraging this observation, video popularity may be augmented based on socially trending topics.

It may be difficult to capture video popularity based on multimedia techniques alone. The present disclosure may allow video popularity in a video publishing site to depend not only on traditional factors (such as view count), but also on how socially important the topic for the particular video is. This effect may be referred to as the "social prominence" of a video. The overall new popularity metric, which is a combination of traditional and social, may be referred to as "Trend Aware Popularity (TAP)." Thus, the present disclosure may empower videos with social stream trend awareness, influencing social video popularity.

Figure 4:
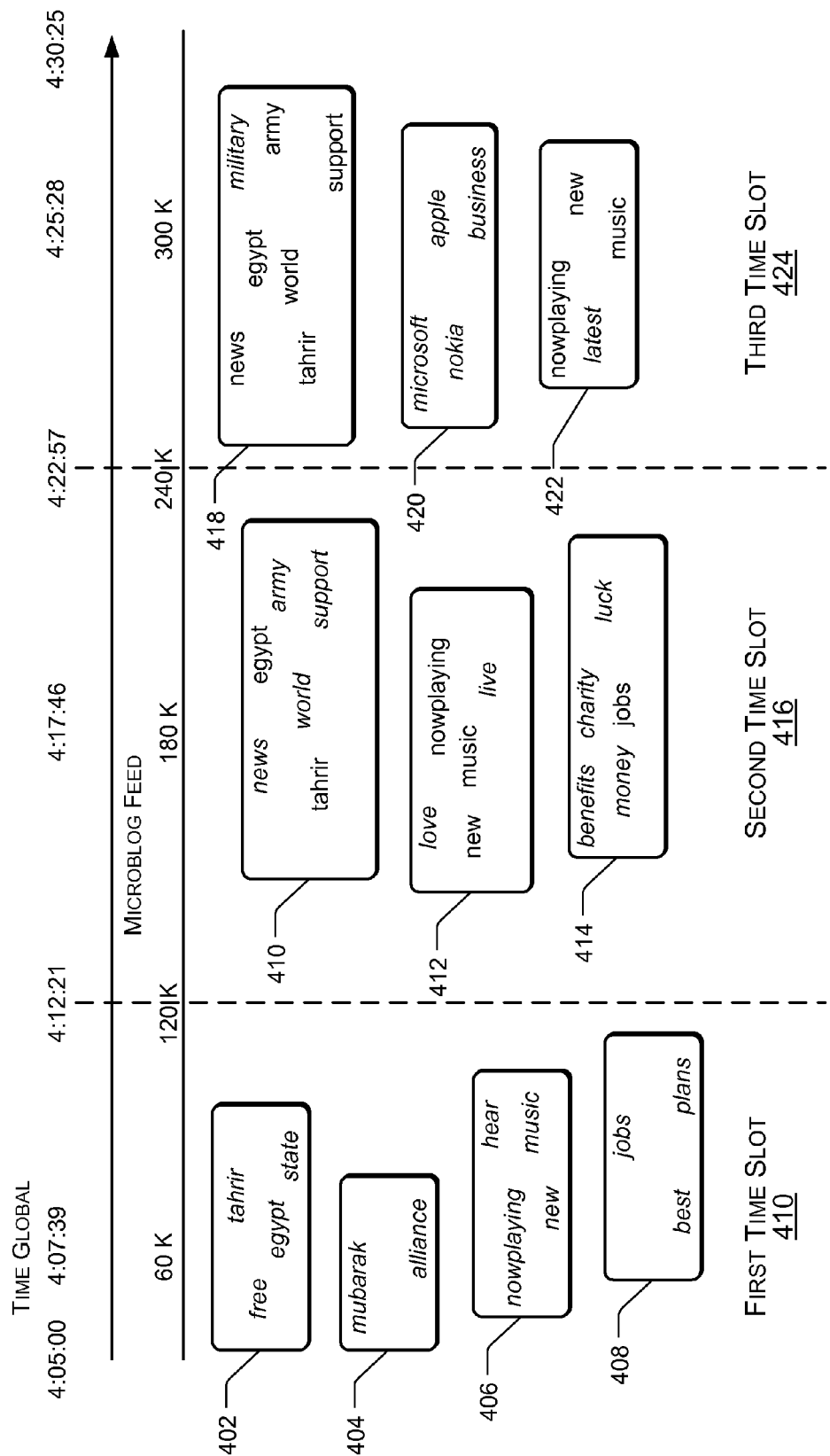
FIG. 4 illustrates an example of topic change in a microblog feed over time according to some implementations.

A microblog site may provide its users with a set of trending topics by geography. This set of trending topics may be calculated using a naive keyword (# hash tag) approach. Observing that trends simply represent topics with high weight over a stream of entries, the LDA topic modeler 112 may again be used for this purpose. The LDA topic modeler 112 may be modified to accept streams of incoming microblog entries (as illustrated in FIG. 4). In particular, by summing each column of the topic-microblog entries probability distribution matrix and comparing the result, it may be determined which topics in the whole topic space (Z) have the maximum membership over the set of microblog entries (D).

Thus, as streams of microblog entries are received over time, the maximum membership topics may be detected, as shown in FIG. 4. In FIG. 4, the boxes represent topics, with each topic including identified topical words. This membership may be considered as a sign of trending nature. The higher boxes denote stronger membership. For illustrative purposes, FIG. 4 includes four topics 402, 404, 406, and 408 in a first time slot 410. For example, in FIG. 4, the topic on {Egypt, tahrir, etc.} (identified as topic 402 in the first time slot 410 of FIG. 4) is more trending than the topic on {# nowplaying, music, etc.}, identified as topic 404 in the first time slot 410 of FIG. 4. In FIG. 4, three topics 410, 412, and 414 are illustrated in a second time slot 416, and three topics 418, 420, and 422 are illustrated in a third time slot 424. In the example of FIG. 4, the highest trending topic 410 in the second time slot 416 and the highest trending topic 418 in the third time slot 424 both correspond to the same topic as the highest trending topic 402 in the first time slot 410 (e.g., the Egyptian revolution). However, as illustrated FIG. 4, the OSLDA model may periodically adjust the set of topical words that are associated with the same topic based on incoming microblog entries.

Trends are temporally dynamic entities. Usually, trends are most prominent in the first few minutes after they appear, and their attractiveness fades away in time. Therefore, the present disclosure's formulation of social prominence may use a time decay factor, such that the social prominence of a topic reduces in time. The social prominence of a topic z may be defined using a trending score, determined using Equation [4] below:

$$Tscore_z = \frac{\sum_{m=1}^{|D|} P(z \mid d_m, t_{cur})}{|D| \cdot \delta_z} \qquad [4]$$

In Equation [4], $\delta_z = f(t_{cur}, t_{onset})$ is the time decay factor. The system receives a set of D microblog entries in one time slot, where $t_{cur}$ is the current time slot and $t_{onset}$ is the time slot when the trend was first observed.

The decay function may be modeled as either a blind decay or an active decay. Blind decay does not determine whether the trend increases or decreases in the next time slot in real life. For example, blind decay can be computed as shown in Equation [5] below:

$$\delta_z = \begin{cases} 1, & t_{cur} = t_{onset} \\ 1 + \frac{t_{cur} - t_{onset}}{2}, & t_{cur} > t_{onset} \end{cases} \qquad [5]$$

On the other hand, an active decay identifies when a trend appears, falls and then rises again in real time. Active decay does not reduce social prominence when the trend rises for the second time. Active decay may be calculated using Equation [6] below:

$$tr = \begin{cases} 1, & P(z|D, t_{cur}) \geq P(z|D, t_{cur} - 1) \\ 0, & P(z|D, t_{cur}) < P(z|D, t_{cur} - 1) \end{cases} \quad [6]$$

$$\delta_z = \begin{cases} 1, & t_{cur} = t_{onset} \\ \delta_z, & t_{cur} > t_{onset} \text{ and } tr = 1 \\ \delta_z + 0.5, & t_{cur} > t_{onset} \text{ and } tr = 0 \end{cases}$$

Active decay may be appropriate for more dynamic topics, unlike those topics that have been trends for more than hours (some trending topics on microblog sites have this nature).

Thus, Trend Aware Popularity (TAP) may represent a combination of traditional popularity factors (like view counts or comments) and the social prominence of the video topic. For a video v, $z^*$ may be selected as the topic to which the video has maximum membership. Thus, $z^*$ is the principal topic for video v. The topic $z^*$ is connected to a set of videos $V^*$, all of which have some sort of membership to $z^*$, defined by Equation [2] above. Therefore, the final temporal popularity score to assign to the video v is given by Equation [7] below:

$$TAP_{v-z^*} = \gamma \cdot TScore_{z^*} + (1-\gamma) \cdot \frac{\# vc(v) - \min \# vc(V^*)}{\max \# vc(V^*) - \min \# vc(V^*)} \quad [7]$$

Thus, Equation [7] may represent the popularity of the video v based on both external social (trend) and internal direct activity (view count) factors. The parameter γ is a weighing parameter that may be used to balance social versus traditional control. That is, a weighting factor may be used to determine a contribution of a view count to a popularity ranking of a media item.

Thus, the present disclosure describes how cross domain media can be recommended based on social streams and how media popularity can be affected based on their social prominence. The same can be applied to images and other cross domain media across the web.

Figure 5:
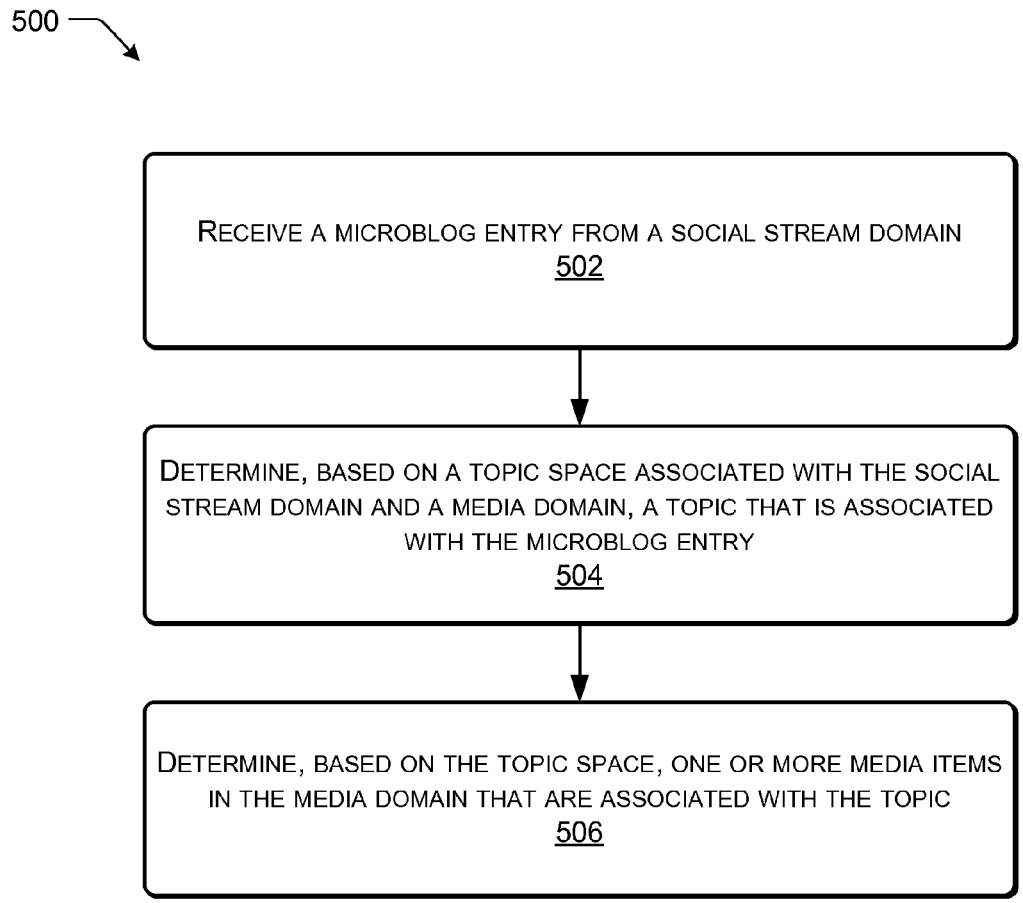
FIG. 5 illustrates an example process flow for determining one or more media items associated with a topic according to some implementations.

Referring to FIG. 5, an example of a method of determining media items (e.g., videos) in a media domain that are associated with a topic is illustrated and generally designated 500.

At block 502, the method 500 may include receiving a microblog entry from a social stream domain. For example, the received microblog entry may include the microblog entry 118 received from the social stream domain 104 of FIG. 1.

At block 504, the method 500 may include determining, based on a topic space associated with the social stream domain and a media domain, a topic that is associated with the microblog entry. For example, the topic space may include the topic space 102 of FIG. 1 that is associated with the social stream domain 104 (e.g., a microblog domain) and the media domain 106 (e.g., a video domain).

At block 506, the method 500 may include determining, based on the topic space, one or more media items in the media domain that are associated with the topic. For example, the one or more media items may include one or more videos (e.g., the first video 120, the second video 122, and the third video 124) in the media domain 106 of FIG. 1.

Figure 6:
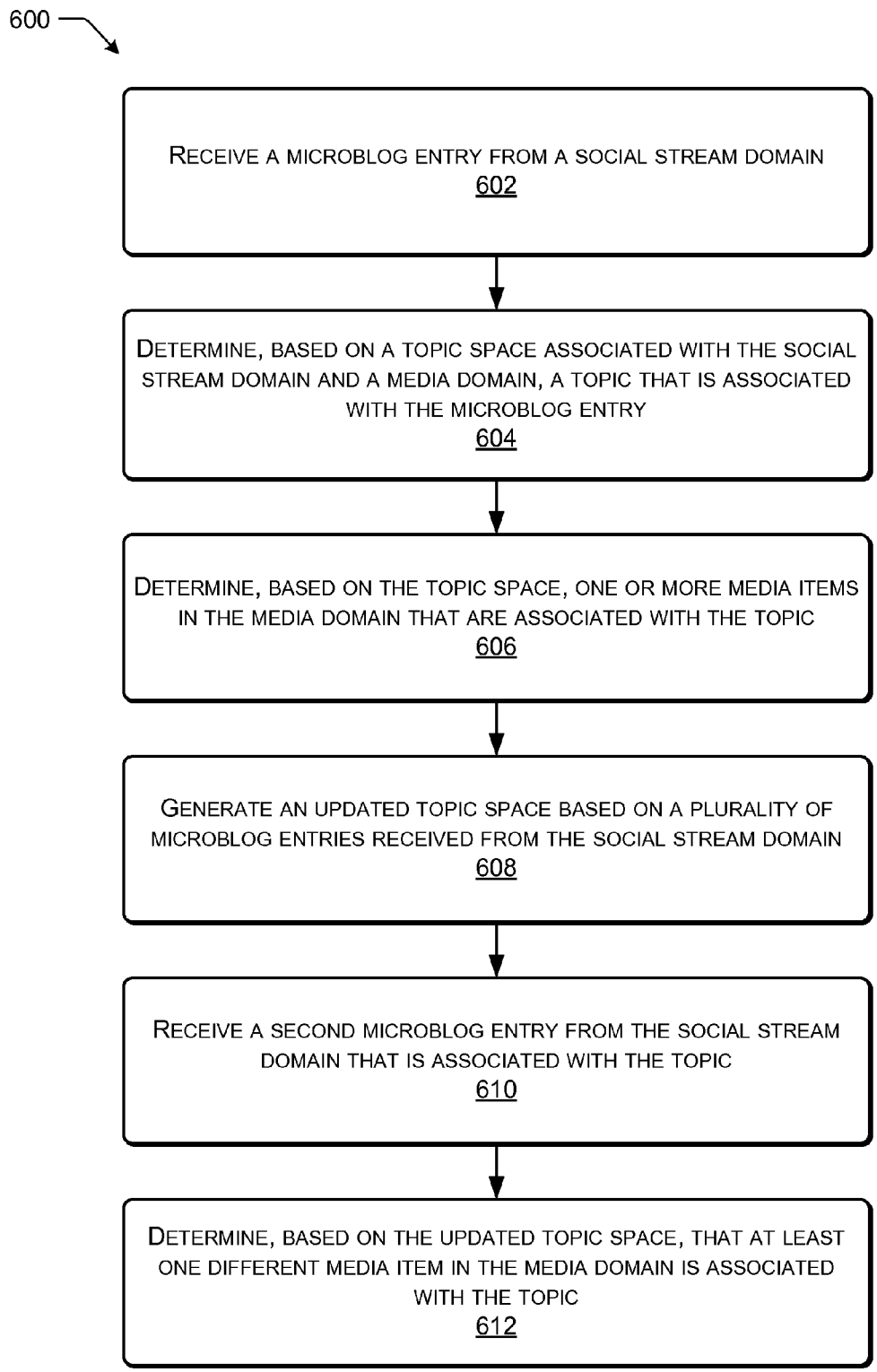
FIG. 6 illustrates an example process flow for determining one or more media items associated with a topic according to some implementations.

Referring to FIG. 6, an example of a method of determining media items in a media domain that are associated with a topic is illustrated and generally designated 600.

At block 602, the method 600 may include receiving a microblog entry from a social stream domain. At block 604, the method 600 may include determining, based on a topic space associated with the social stream domain and a media domain, a topic that is associated with the microblog entry. At block 606, the method 600 may include determining, based on the topic space, one or more media items in the media domain that are associated with the topic.

At block 608, the method 600 may include generating an updated topic space based on a plurality of microblog entries received from the social stream domain. For example, referring to FIG. 2, the method 600 may include utilizing the LDA modeler 112 to periodically update the topic space 102 based on microblog entries received via the microblog feed. Further, FIG. 4 illustrates the dynamic nature of topics in the microblog feed.

At block 610, the method 600 includes receiving a second microblog entry from the social stream that is associated with the topic (i.e., the same topic identified at block 604).

At block 612, the method 600 includes determining, based on the updated topic space, that at least one different media item in the media domain is associated with the topic.

Example Computing Device and Environment

Figure 7:
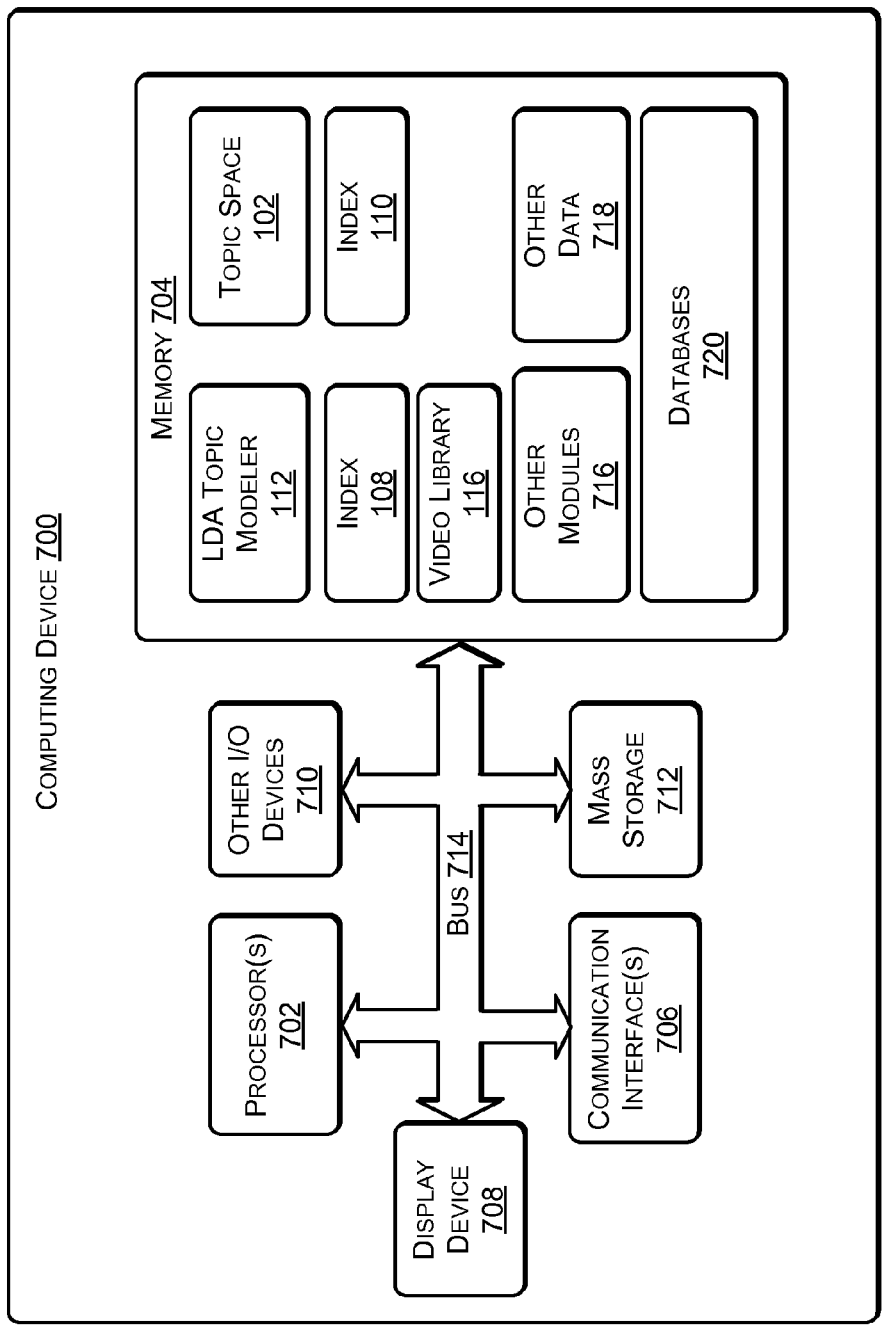
FIG. 7 illustrates an example computing device and system environment in which some implementations may operate.

FIG. 7 illustrates an example configuration of a computing device 700 and an environment that can be used to implement the modules and functions described herein.

The computing device 700 may include at least one processor 702, a memory 704, communication interfaces 706, a display device 708 (e.g. a touchscreen display), other input/output (I/O) devices 710 (e.g. a touchscreen display or a mouse and keyboard), and one or more mass storage devices 712, able to communicate with each other, such as via a system bus 714 or other suitable connection.

The processor 702 may be a single processing unit or a number of processing units, all of which may include single or multiple computing units or multiple cores. The processor 702 can be implemented as one or more microprocessors, microcomputers, microcontrollers, digital signal processors, central processing units, state machines, logic circuitries, and/or any devices that manipulate signals based on operational instructions. Among other capabilities, the processor 702 can be configured to fetch and execute computer-readable instructions stored in the memory 704, mass storage devices 712, or other computer-readable media.

Memory 704 and mass storage devices 712 are examples of computer storage media for storing instructions which are executed by the processor 702 to perform the various functions described above. For example, memory 704 may generally include both volatile memory and non-volatile tangible memory devices (e.g., RAM, ROM). Further, mass storage devices 712 may generally include hard disk drives, solid-state drives, removable media, including external and removable drives, memory cards, flash memory, floppy disks, optical disks (e.g., CD, DVD), a storage array, a network attached storage, or a storage area network. Both memory 704 and mass storage devices 712 may be collectively referred to as memory or computer storage media herein, and may be computer-readable media capable of storing computer-readable, processor-executable program instructions as computer program code that can be executed by the processor 702 as a particular machine configured for carrying out the operations and functions described in the implementations herein.

The computing device 700 may also include one or more communication interfaces 706 for exchanging data with other devices, such as via a network, direct connection, or the like, as discussed above. The communication interfaces 706 can facilitate communications within a wide variety of networks and protocol types, including wired networks (e.g., LAN, cable, etc.) and wireless networks (e.g., WLAN, cellular, satellite, etc.), the Internet and the like. Communication interfaces 706 can also provide communication with external storage (not shown), such as in a storage array, network attached storage, storage area network, or the like.

The discussion herein refers to data being sent and received by particular components or modules. This should not be taken as a limitation as such communication need not be direct and the particular components or module need not necessarily be a single functional unit. This is not to be taken as limiting implementations to only those in which the components directly send and receive data from one another. The signals could instead be relayed by a separate component upon receipt of the data. Further, the components may be combined or the functionality may be separated amongst components in various manners not limited to those discussed above. Other variations in the logical and practical structure and framework of various implementations would be apparent to one of ordinary skill in the art in view of the disclosure provided herein.

A display device 708, such as touchscreen display or other display device, may be included in some implementations. Other I/O devices 710 may be devices that receive various inputs from a user and provide various outputs to the user, and may include a touchscreen, such as a touchscreen display, a keyboard, a remote controller, a mouse, a printer, audio input/output devices, and so forth.

Memory 704 may include modules and components for execution by the computing device 700 according to the implementations discussed herein. In the illustrated example, memory 704 includes the topic-microblog inverted index 108, the record level inverted index 110, the video library 116, the LDA topic modeler 112 and the topic space 102 as described above with regard to FIG. 1. Memory 704 may further include one or more other modules 716, such as an operating system, drivers, application software, communication software, or the like. Memory 704 may also include other data 718, such as data stored while performing the functions described above and data used by the other modules 716. Memory 704 may also include other data and data structures described or alluded to herein. For example, memory 704 may include information that is used in the course of deriving and generating the topic space 102 as described above.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Although illustrated in FIG. 7 as being stored in memory 704 of computing device 700, the indexes 108 and 110, the LDA topic modeler 112, the video library 116 and the topic space 102, or portions thereof, may be implemented using any form of computer-readable media that is accessible by computing device 700. As used herein, "computer-readable media" includes computer storage media and communication media.

Computer storage media includes volatile and non-volatile, removable and non-removable media implemented in any method or technology for storage of information, such as computer readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave. As defined herein, computer storage media does not include communication media.

Figure 8:
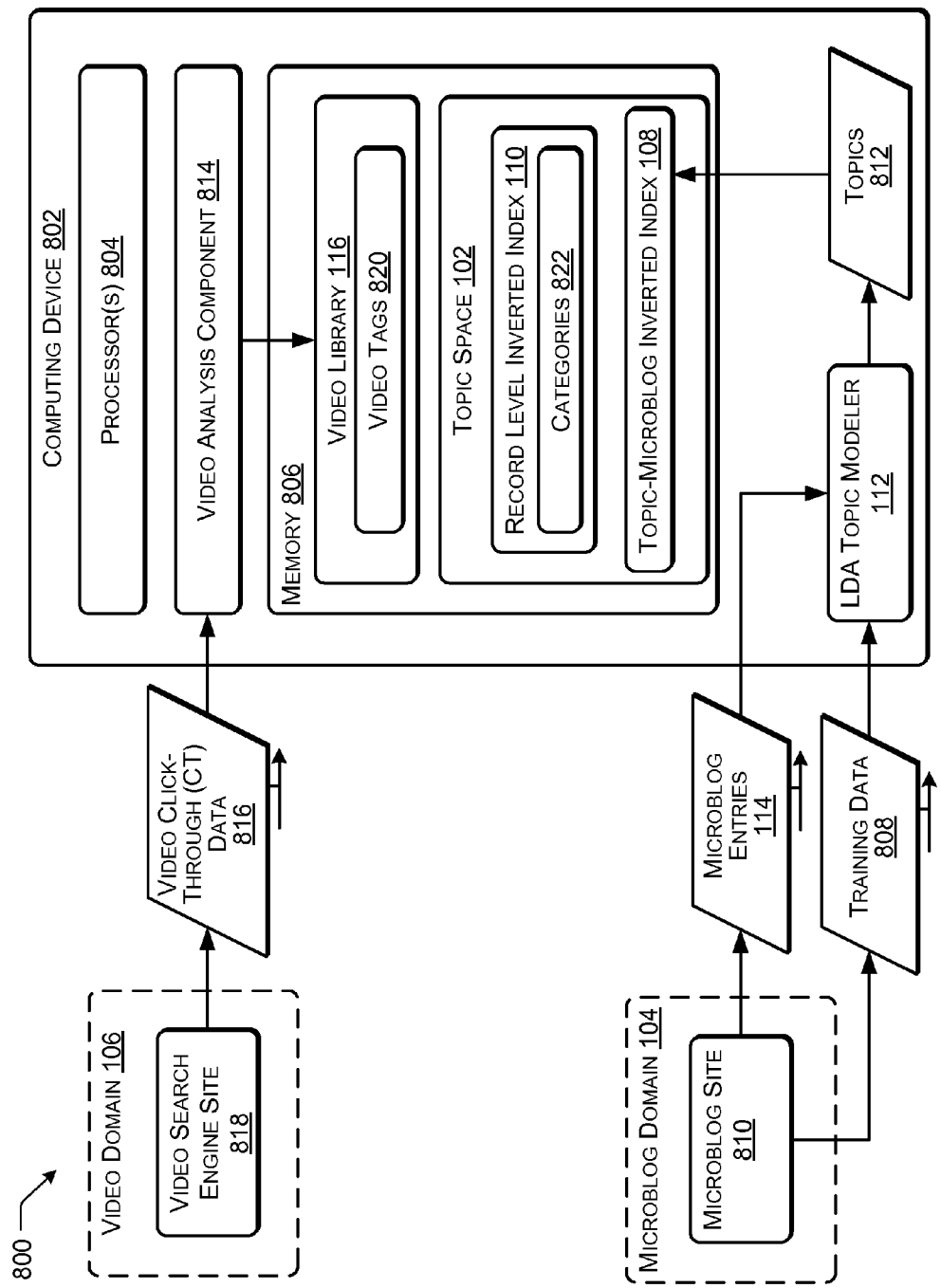
FIG. 8 illustrates an example system including a topic space according to some implementations.

FIG. 8 illustrates an example framework of a system 800 according to some implementations. The system 800 includes a computing device 802 that includes one or more processors 804 and at least one memory 806. The computing device 802 includes the LDA topic modeler 112 to build the topic space 102 based on training data and to periodically update the topic space 102. In a particular embodiment, the computing device 802 of FIG. 8 may correspond to the computing device 101 of FIG. 1.

To build the topic space 102 from the social stream side, the computing device 802 may receive training data 808 from a microblog site 810. The training data 808 may represent a plurality of microblog entries collected over a period of time. The LDA topic modeler 112 may process the training data 808 and determine a plurality of topics 812. The LDA topic modeler 112 may generate the topic-microblog inverted index 108 based on the plurality of topics 812 identified based on the training data 808.

A video analysis component 814 of the computing device 802 may receive video Click-Through (CT) data 816 from a video search engine site 818. The video analysis component 814 may extract video information (illustrated as video tags 820 in FIG. 8) from the CT data 816 and store the video tags 820 in the video library 116. The video analysis component 814 may generate the record level inverted index 110 based on the video tags 820 stored in the video library 116. The video analysis component 814 may further divide the record level inverted index 110 into categories 822 for easier indexing.

After initially building the topic space 102 based on the video CT data 816 and the training data 808, the LDA topic modeler 112 may periodically update the topic space 102 in substantially real time based on the plurality of microblog entries 114 received from the microblog site 810.

The memory 806 is an example of computer storage media for storing instructions which are executed by the one or more processors 804 to perform the various functions described above. Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
   generating a topic space based on a plurality of microblog entries and click-through data associated with a plurality of media items in a media domain, the microblog entries being unrelated to entities accessing the microblog entries;
   receiving a microblog entry from a social stream domain;
   determining, by one or more processors, based on the topic space associated with the social stream domain and the media domain, a topic that is associated with the microblog entry; and
   determining, based at least on a tag of one or more media items in the media domain being in common with a word of the topic, that the one or more media items in the media domain are associated with the topic.

2. The method as recited in claim 1, wherein the one or more media items in the media domain include one or more videos.

3. The method as recited in claim 1, wherein the topic space is periodically updated.

4. The method as recited in claim 1, further comprising recommending the one or more media items in response to receiving the microblog entry.

5. The method as recited in claim 1, wherein the generating the topic space is further based on a Latent Dirichlet Allocation (LDA) model.

6. The method as recited in claim 1, further comprising generating an updated topic space based on a plurality of additional microblog entries that are received via the social stream domain.

7. The method as recited in claim 6, further comprising:
   receiving a second microblog entry from the social stream domain that is associated with the topic; and
   determining, based on the updated topic space, that at least one different media item in the media domain is associated with the topic.

8. The method as recited in claim 6, further comprising determining a popularity ranking of a media item in the media domain based at least in part on the updated topic space.

9. The method as recited in claim 8, wherein the popularity ranking of the media item is further determined based on a view count of the media item.

10. The method as recited in claim 9, wherein a weighting factor is used to determine a contribution of the view count to the popularity ranking of the media item.

11. The method as recited in claim 6, wherein the updated topic space is updated using a time decay function.

12. The method as recited in claim 11, wherein the time decay function includes an active time decay function.

13. The method as recited in claim 1, further comprising providing a query suggestion in response to receiving the microblog entry.

14. The method as recited in claim 1, wherein the plurality of microblog entries used to generate the topic space are unrelated to a network access history associated with the entities accessing the plurality of microblog entries.

15. A computing system comprising:
   one or more processors;
   one or more computer-readable media maintaining instructions that, when executed by the one or more processors, cause the one or more processors to perform acts comprising:
      generating a first topic space based on a plurality of microblog entries, the plurality of microblog entries being unrelated to a network access history of the computing system;
      receiving a microblog entry from a social stream domain;
      determining, based on a second topic space associated with the plurality of microblog entries and a media domain, a topic that is associated with the microblog entry;
      determining, based on the second topic space, one or more videos in the media domain that are associated with the topic;
      identifying the one or more videos as recommended videos based on the microblog entry; and
      determining a popularity ranking of the one or more recommended videos based on a first weight associated with a view count of the one or more recommended videos and a second weight associated with a number of tags that the one or more recommended videos have in common with words of the topic.

16. The computing system as recited in claim 15, the acts further comprising:
   generating an updated topic space based on a plurality of additional microblog entries that are received via the social stream domain;
   receiving a second microblog entry from the social stream domain that is associated with the topic;
   determining, based on the updated topic space, that at least one different video in the media domain is associated with the topic; and identifying the at least one different video as a recommended video based on the second microblog entry.

17. The computing system as recited in claim 16, the acts further comprising increasing a popularity ranking of the at least one different video in the media domain.

18. A server device comprising:
one or more processors;
one or more computer-readable media maintaining instructions that, when executed by the one or more processors, cause the one or more processors to perform acts comprising:
generating a first topic space based on a plurality of microblog entries, the plurality of microblog entries being unrelated to a network access history of a computing device;
receiving a microblog entry from a social stream domain;
determining, based on a second topic space associated with the plurality of microblog entries and a media domain, a topic that is associated with the microblog entry;
determining, based on the second topic space, one or more videos in the media domain that are associated with the topic; identifying the one or more videos as recommended videos based on the microblog entry;
determining a popularity ranking of the one or more recommended videos based on a first weight associated with a view count of the one or more recommended videos and a second weight associated with a number of tags that the one or more recommended videos have in common with words of the topic; and
communicating, to the computing device over a network, information associated with the ranked one or more recommended videos.

19. The server device as recited in claim 18, wherein the communicating includes communicating the information over a wireless network.

20. The server device as recited in claim 18, the acts further comprising:
generating an updated topic space based on a plurality of additional microblog entries; and
determining, based on the updated topic space, whether one or more additional videos in the media domain are associated with the topic.

\* \* \* \* \*